(12) United States Patent
Luo et al.

(10) Patent No.: US 10,388,099 B2
(45) Date of Patent: Aug. 20, 2019

(54) PAPER CURRENCY FOLD RECOGNITION APPARATUS AND METHOD

(71) Applicant: GRG BANKING EQUIPMENT CO., LTD., Guangzhou, Guangdong (CN)

(72) Inventors: Panfeng Luo, Guangdong (CN); Tiancai Liang, Guangdong (CN); Xiaofeng Jin, Guangdong (CN); Yong Zhang, Guangdong (CN)

(73) Assignee: GRG BANKING EQUIPMENT CO., LTD., Guangzhou, Guangdong (CN)

( * ) Notice: Subject to any disclaimer, the term of this patent is extended or adjusted under 35 U.S.C. 154(b) by 71 days.

(21) Appl. No.: 15/526,103

(22) PCT Filed: Aug. 20, 2015

(86) PCT No.: PCT/CN2015/087623
§ 371 (c)(1),
(2) Date: May 11, 2017

(87) PCT Pub. No.: WO2016/078455
PCT Pub. Date: May 26, 2016

(65) Prior Publication Data
US 2017/0316632 A1 Nov. 2, 2017

(30) Foreign Application Priority Data

Nov. 19, 2014 (CN) .......................... 2014 1 0665409

(51) Int. Cl.
*G07D 7/20* (2016.01)
*G06T 7/521* (2017.01)
(Continued)

(52) U.S. Cl.
CPC .............. *G07D 7/183* (2017.05); *G06T 7/521* (2017.01); *G06T 7/579* (2017.01); *G07D 7/20* (2013.01); *G06T 2207/10152* (2013.01); *G06T 2207/20076* (2013.01); *G06T 2207/20081* (2013.01); *G06T 2207/20084* (2013.01)

(58) Field of Classification Search
CPC ..................................................... G07D 7/183
See application file for complete search history.

(56) References Cited

U.S. PATENT DOCUMENTS

| 6,522,399 B1 | 2/2003 | Lawrence et al. |
| 7,184,149 B2 | 2/2007 | Swanson et al. |

(Continued)

FOREIGN PATENT DOCUMENTS

| CN | 1841013 A | 10/2006 |
| CN | 1892710 A | 1/2007 |

(Continued)

OTHER PUBLICATIONS

Extended European Search Report for corresponding Application No. 15861703.5 dated Nov. 3, 2017.

(Continued)

*Primary Examiner* — Ping Y Hsieh
*Assistant Examiner* — Jose Torres
(74) *Attorney, Agent, or Firm* — Yue (Robert) Xu; Apex Attorneys at Law, LLP

(57) ABSTRACT

Provided are a device and method for identifying a paper currency fold. The device includes: a transparent protective body, configured to maintain components in the device to be clean; a laser source, configured to emit laser light a rectangular grating, configured to modulate the laser light into stripes which changes to be bright or dark according to a certain rule on a surface of a paper currency; an area array photoelectric sensor, configured to capture an image; an imaging lens group, configured to converge an image of the surface of the paper currency onto the area array photoelectric sensor; and an information processing module electrically connected with the area array photoelectric sensor, configured to process an image signal captured by the area array photoelectric sensor.

12 Claims, 3 Drawing Sheets

(51) Int. Cl.
*G06T 7/579* (2017.01)
*G07D 7/183* (2016.01)

(56) References Cited

U.S. PATENT DOCUMENTS

| | | |
|---|---|---|
| 2004/0061855 A1 | 4/2004 | Klock |
| 2007/0007103 A1 | 1/2007 | Takai |
| 2011/0064279 A1 | 3/2011 | Uno |
| 2011/0255767 A1* | 10/2011 | Jenrick .................. G07D 7/162 382/135 |

FOREIGN PATENT DOCUMENTS

| | | |
|---|---|---|
| CN | 1959337 A | 5/2007 |
| CN | 200976166 Y | 11/2007 |
| CN | 101451826 A | 6/2009 |
| CN | 101901511 A | 12/2010 |
| CN | 102142165 A | 8/2011 |
| CN | 102568081 A | 7/2012 |
| CN | 103115586 A | 5/2013 |
| CN | 104331978 A | 2/2015 |
| DE | 10159234 A1 | 6/2003 |
| EP | 1644699 A2 | 4/2006 |
| EP | 2546808 A1 | 1/2013 |
| WO | 2012116807 A1 | 9/2012 |

OTHER PUBLICATIONS

International Search Report for PCT/CN2015/087623, dated Nov. 10, 2015, ISA/CN.

* cited by examiner

PAPER CURRENCY FOLD RECOGNITION APPARATUS AND METHOD

The present application is a National Stage application of PCT international patent application PCT/CN2015/087623, filed on Aug. 20, 2015 which claims the priority to Chinese Patent Application No. 201410665409.5, titled "PAPER CURRENCY FOLD RECOGNITION APPARATUS AND METHOD", filed on Nov. 19, 2014 with the State Intellectual Property Office of the People's Republic of China, both of which are incorporated herein by reference in their entireties.

FIELD

The present disclosure relates to non-contact optical detection technology, and particularly to a device and a method for identifying a paper currency fold.

BACKGROUND

Our country has a large population, the amount of cash in circulation is huge. According to statistical data of the People's Bank of China, monetary aggregates in circulation of China reaches 6.7 trillions yuan RMB by the first quarter of 2014. Battered paper currency in circulation occupies a large proportion, it is a quite tricky problem for each bank to count, select the paper currency and discriminate a version of the paper currency. In order to improve the cleanliness degree of RMB in circulation and maintain the credibility of RMB, the People's Bank of China has developed "Selection Standard on RMB Not Suitable for Circulation". The paper currency with an obvious fold or deformation belongs to one situation of RMB not suitable for circulation. Thus it is required to automatically determine whether a fold exists in the paper currency and whether the fold degree of the paper currency affects common circulation of the paper currency.

In the conventional method for identifying the paper currency fold, a captured image of the paper currency is processed, it is determined whether a fold exists in the paper currency through change of gray values of adjacent pixels of the captured image of the paper currency, and then it determined whether the fold degree of the paper currency affects circulation of the paper currency based on an experience value or a threshold determined by analyzing statistics of a certain amount of paper currency samples. As a contact image sensor of a paper currency capturing device has a temperature characteristic, there are differences among the gray values of the pixels of the images of the paper currency captured at different temperatures. In a case that the gray values are significantly affected by the temperature, a color cast phenomena occurs at different degrees in the captured images of the paper currency, and identification of the paper currency fold is affected. Moreover, a single statistical model has an uncertainty, which may not satisfy a requirement of an accurate identification of the paper currency fold.

SUMMARY

In order to solve the problem in the conventional technology that the contact image sensor has a temperature characteristic which greatly affects identification of a paper currency fold, a device for identifying a paper currency fold is provided according to the disclosure. According to the provided device, a new image acquiring method is used, which improves an identification rate of the paper currency fold.

The device for identifying the paper currency fold includes: a transparent protective body, configured to maintain components in the device to be clean; a laser source, configured to emit laser light; a rectangular grating arranged above the laser source, configured to modulate the laser light into stripes which changes to be bright or to be dark according to a certain rule on a surface of a paper currency; an area array photoelectric sensor, configured to capture an image; an imaging lens group arranged above the area array photoelectric sensor, configured to converge an image of the surface of the paper currency onto the area array photoelectric sensor; and an information processing module electrically connected with the area array photoelectric sensor, configured to process an image signal captured by the area array photoelectric sensor.

Preferably, the rectangular grating is driven to rotate by power.

A method for identifying a paper currency fold is provided according to the disclosure. The method includes:

step 1, receiving a to-be-detected paper currency transported from a note-transporting organization, and projecting laser light generated by a laser source into grating stripes which changes to be bright or to be dark according to a certain rule on the to-be-detected paper currency through a rectangular grating and a protective body;

step 2, acquiring, by an area array photoelectric sensor, an image of the to-be-detected paper currency attached with the grating stripes through an imaging lens group, and obtaining a feature image of the grating stripes from the acquired image of the to-be-detected paper currency attached with the grating stripes;

step 3, rotating the rectangular grating, changing a direction of the grating stripes projected on the to-be-detected paper currency by the laser source through the rectangular grating, repeating to perform step 2 to obtain the feature images of the grating stripes in n angles from the images of the to-be-detected paper currency attached with the grating stripes, with n being an integer more than or equal to 2;

step 4, calculating, by an information processing module, a gradient changing cumulative value P of the feature images of the grating stripes in n angles along the directions of the grating stripes corresponding to the to-be-detected paper currency based on the feature images of the grating stripes in n angles of the to-be-detected paper currency; and step 5, determining whether a fold exists in the to-be-detected paper currency by comparing the gradient changing cumulative value P corresponding to the to-be-detected paper currency with a preset determining threshold T, where it is determined that the fold does not exist in the to-be-detected paper currency in a case that $P \leq T$, and the to-be-detected paper currency is allowed to be circulated, and it is determined that the fold exists in the to-be-detected paper currency in a case that $P > T$, and the to-be-detected paper currency is not allowed to be circulated.

Preferably, obtaining the determining threshold T includes:

step 1, receiving a circulated paper currency transported from the note-transporting organization, and projecting the laser light generated by the laser source into grating stripes which changes to be bright or to be dark according to a certain rule on the circulated paper currency through the rectangular grating and the protective body;

step 2, acquiring, by the area array photoelectric sensor, an image of the circulated paper currency attached with the grating stripes through the imaging lens group, and obtaining a feature image of the grating stripes from the acquired image of the circulated paper currency attached with the grating stripes;

step 3, rotating the rectangular grating, changing a direction of the grating stripes projected on the circulated paper currency by the laser source through the rectangular grating, repeating to perform step 2 to obtain the feature images of the grating stripes in n angles from the images of the circulated paper currency attached with the grating stripes, with n being an integer more than or equal to 2;

step 4, calculating, by the information processing module, a gradient changing cumulative value S of the feature images of the grating stripes in n angles along the directions of the grating stripes corresponding to the circulated paper currency based on the feature images of the grating stripes in n angles of the circulated paper currency;

step 5, performing, by the information processing module, step 1 to step 4 for each of U circulated paper currency samples to obtain the gradient changing cumulative value $S_a$ of the images of the grating stripes along the directions of the grating stripes corresponding to each of circulated paper currencies, where a=1, 2, . . . , U; and step 6, obtaining, by the information processing module, the determining threshold T for determining whether the fold exists by adopting at least one of a statistical analysis model and an artificial neural network learning and training method for the gradient changing cumulative value $S_a$ as a feature.

Preferably, the circulated paper currency refers to a paper currency sample can be normally circulated in accordance with a regulation of the People's Bank of China, and the grating stripes which changes to be bright or to be dark according to the certain rule refer to stripes generated by modulating the laser light by the rectangular grating.

Preferably, n is an integer more than or equal to 8, rotating angles of the rectangular grating are angles generated by evenly dividing a 360 degrees field into n–1 parts. Taking 8 angles as an example, the 8 angles mean that the rotating angles of the rectangular grating are 0 degree, 45 degree, 90 degree, 135 degree, 180 degree, 225 degree, 270 degree and 315 degree respectively. That is, the rotating angles of the rectangular grating are generated by evenly dividing the 360 degrees field into 7 parts.

Preferably, the gradient changing cumulative values P and S of the feature images of the grating stripes in n angles along the directions of the grating stripes are calculated based on following formulas:

$$P = \sum_{i=1}^{n}\sum_{j=1}^{M}\sum_{K=1}^{N}[P(i,j,K+1) - P(i,j,K)];$$

$$S = \sum_{i=1}^{n}\sum_{j=1}^{M}\sum_{K=1}^{N}[P(i,j,K+1) - P(i,j,K)];$$

where i represents the number of rotating angles of the rectangular grating, n represents an integer more than or equal to 2, M represents the number of changes between being bright and being dark of the feature image of the grating stripes, N represents the number of pixels of a single stripe along the direction of the stripe, and P(i, j, K) represents a pixel value of the K-th pixel of the j-th stripe of a captured image of the grating stripes in the i-th angle.

Preferably, the statistical analysis model includes at least one of a range analysis, a variance analysis and an interval estimation weighted analysis.

Preferably, a specific calculating formula for the a range analysis value is:

$$r = \frac{\max(S_a) - \min(S_a)}{2}, a = 1, 2, \ldots, U,$$

where a range analysis value r corresponds to half of a maximum value and a minimum value of the folds of the circulated paper currency samples, and U represents the number of the paper currency samples.

Preferably, a specific formula for the variance analysis is:

$$f = \sum_{a=1}^{U}[S_a - \overline{S}], a = 1, 2, \ldots, U,$$

where a variance analysis value f corresponds to a fluctuation degree of the folds of the circulated paper currency samples, U represents the number of the paper currency samples, $\overline{S}$ represents an average value of the gradient changing cumulative values $S_a$ of the circulated paper currency samples, and a specific formula for $\overline{S}$ is:

$$\overline{S} = \frac{\sum_{a=1}^{U}S(a)}{U}, a = 1, 2, \ldots, U.$$

Preferably, a specific formula for the interval estimation weighted analysis is:

$$q = Z_{1-b}\frac{d}{\sqrt{U}},$$

where an interval estimation weighted value q corresponds to a parameter estimation of the folds of the circulated paper currency samples, U represents the number of the paper currency samples, $Z_{1-b}$ represents a confidence factor, 1-b represents a confidence level, and d represents a scale parameter.

Preferably, the obtaining, by the information processing module, the determining threshold T for determining whether the fold exists by adopting at least one of a statistical analysis model and an artificial neural network learning and training method includes:

learning and training, by the information processing module, a range analysis statistic value r, a variance analysis statistic value f and an interval estimation weighted analysis value q by adopting an artificial neural network method;

estimating an error of a direct leading layer of an output layer by utilizing an outputted error of the output layer, estimating an error of a layer in front of the direct leading layer by utilizing the error of the direct leading layer, and iterating layer by layer in the above manner to estimate an error of each of layers;

changing continually, by an artificial neural network, a connection weight value of the network under stimulation from an outside inputted sample, to make an output of the network continually close to an expected output; and obtaining a range analysis weight value $\omega_1$, a variance analysis weight value $\omega_2$ and an interval estimation weight value $\omega_3$, and then obtaining the threshold T of the gradient changing cumulative value for determining whether the stripe is curved in an image of the grating stripes, where a specific formula for the threshold T is:

$$T=\overline{S}+\omega_1 r+\omega_2 f+\omega_3 q.$$

The method for identifying a paper currency fold provided by the disclosure has the following advantages.

According to the method for identifying a paper currency fold provided by the disclosure, a detection for determining whether a fold exists in the paper currency is converted into a detection for determining whether the stripe is curved in an image of the grating stripes, which effectively avoids effect of color cast phenomena on the identification of the paper currency fold caused by the gray values of the captured image of the paper currency changing in different temperature situations, and improves an identifying rate of the paper currency fold. In the method, the threshold for determining whether a fold state of the paper currency affects the circulation of the paper currency is determined by taking the gradient changing cumulative value of the images of the grating stripes along the directions of the stripes corresponding to the circulated paper currency samples as a feature and by analyzing multiple statistical parameters and using a learning and training method, and accurate identification of the paper currency fold is achieved. Compared with a method of adopting an experiencing value or a single statistical parameter analysis to determine the threshold, the method for determining the threshold according to the disclosure is more real and reliable and has a stronger universality.

DETAILED DESCRIPTION OF EMBODIMENTS

In order to further illustrate the method and the device for identifying the paper currency fold according to the disclosure, embodiments are described in detail in conjunction with drawings.

Figure 1:
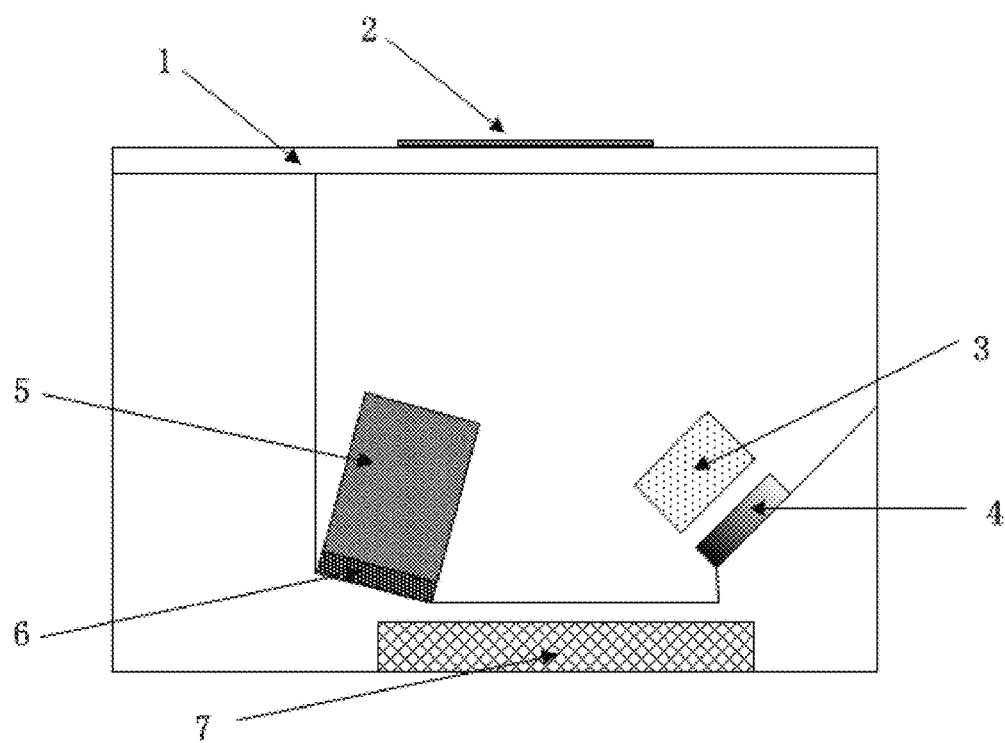
FIG. 1 is a schematic structural diagram of a device for identifying a paper currency fold.

A method for identifying a paper currency fold is provided according to the embodiment. A device for identifying a paper currency fold, as an implementing device of the method, is shown in FIG. 1. The device for identifying the paper currency fold includes a transparent protective body 1, a rectangular grating 3, a laser source 4, an imaging lens group 5, an area array photoelectric sensor 6 and an information processing module 7. The laser source 4 is configured to emit laser light. The rectangular grating 3 is arranged above the laser source 4 and configured to modulate the laser light 4 into stripes which changes to be bright or to be dark according to a certain rule on a surface of the paper currency. The area array photoelectric sensor 6 is configured to capture an image. The imaging lens group 5 is arranged above the area array photoelectric sensor 6 and configured to converge an image of the surface of the paper currency onto the area array photoelectric sensor 6. The information processing module 7 is electrically connected with the area array photoelectric sensor 6 and configured to process an image signal captured by the area array photoelectric sensor 6. The protective body 1 is configured to maintain components in the device to be clean. The protective body 1 in the embodiment is a transparent glass. It should be noted that the protective body 1 may be other sheet formed by transparent materials with a certain strength, such as a transparent organic sheet.

Based on the description of the above device for identifying a paper currency fold, the method for identifying a paper currency fold provided by the embodiment includes following step 1 to step 5.

Figure 2:
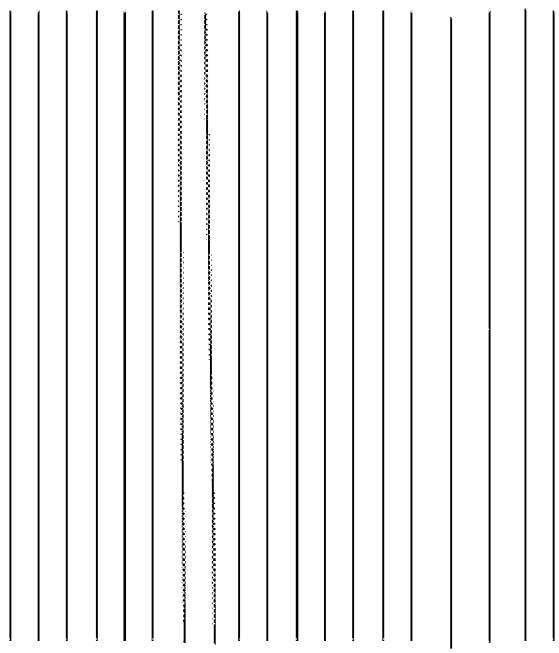
FIG. 2 is a schematic diagram of projected rectangular grating stripes.
Figure 3:
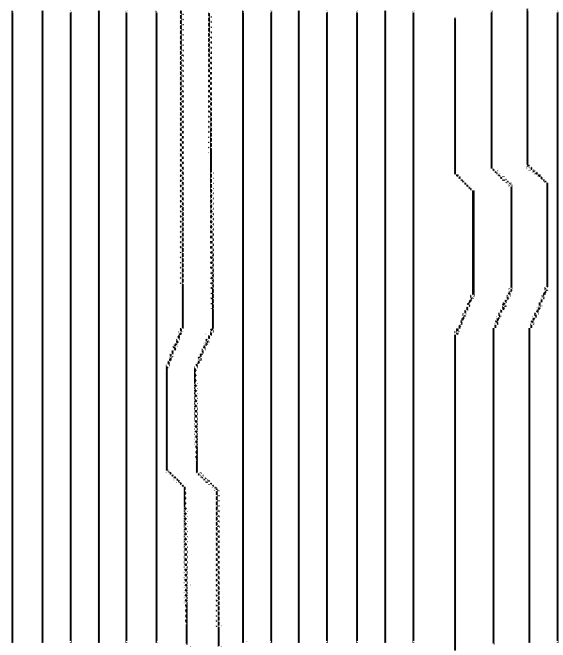
FIG. 3 is a schematic diagram showing that the stripe is curved in an image of the grating stripes caused by a paper currency fold.

In step 1, a to-be-detected paper currency transported from a note-transporting organization is received, and laser light generated by a laser source 4 is projected into grating stripes which changes to be bright or to be dark according to a certain rule on the to-be-detected paper currency through a rectangular grating 3 and a protective body 1. For example, FIG. 2 is a schematic diagram of projected rectangular grating stripes, and FIG. 3 is a schematic diagram showing that the stripe is curved in an image of the grating stripes caused by a paper currency fold.

In step 2, an area array photoelectric sensor 6 acquires an image of the to-be-detected paper currency attached with the grating stripes through an imaging lens group 5, and a feature image of the grating stripes is obtained from the acquired image of the to-be-detected paper currency attached with the grating stripes.

In step 3, the rectangular grating 3 is rotated, it is changed a direction of the grating stripes projected on the to-be-detected paper currency by the laser source through the rectangular grating, step 2 is repeated to be performed to obtain the feature images of the grating stripes in n angles from the images of the to-be-detected paper currency attached with the grating stripes, where n is an integer more than or equal to 2.

In a case that the direction of the paper currency fold is consistent with the direction of the projected grating stripes, the captured grating stripes can not reflect the fold phenomenon in this direction. In order to effectively detect fold information of the paper currency in all directions, images of the projected grating stripes in angles the number of which is more than or equal to 2 needs to be captured. Preferably, n is an integer more than or equal to 8. Rotating angles of the rectangular grating are angles generated by evenly dividing a 360 degrees field into n−1 parts. Taking 8 angles as an example, the rotating angle refers to an angle corresponding to a line where a pixel center of one grating image and a pixel center of another grating image adjacent to the one grating image are located. The 8 angles mean that the rotating angles of the rectangular grating are 0 degree, 45 degree, 90 degree, 135 degree, 180 degree, 225 degree, 270 degree and 315 degree respectively. That is, the rotating angles of the rectangular grating are generated by evenly dividing the 360 degrees field into 7 parts. In a case that n is more than 8, the 360 degrees field is further evenly divided on basis of 0 degree, 45 degree, 90 degree, 135 degree, 180 degree, 225 degree, 270 degree and 315 degree, that is, the 360 degrees field is evenly divided into n−1 parts. Taking 12 angles as an example, the 12 angles mean that the rotating angles of the rectangular grating may be 0 degree, 30 degree, 60 degree, 90 degree, 120 degree, 150 degree, 180 degree, 210 degree, 240 degree, 270 degree, 300 degree and 330 degree respectively, that is, the rotating angles of the rectangular grating are generated by evenly dividing the 360 degrees field into 11 parts.

In step 4, an information processing module 7 calculates a gradient changing cumulative value P of the feature images of the grating stripes in n angles along the directions of the grating stripes corresponding to the to-be-detected paper currency based on the feature images of the grating stripes in n angles of the to-be-detected paper currency. A formula for the gradient changing cumulative value P is $$P = \sum_{i=1}^{n} \sum_{j=1}^{M} \sum_{K=1}^{N} [P(i, j, K+1) - P(i, j, K)],$$

where i represents the number of rotating angles of the rectangular grating, n represents an integer more than or equal to 2, M represents the number of changes between being bright and being dark of the feature image of the grating stripes, N represents the number of pixels of a single stripe along the direction of the stripe, and P(i, j, K) represents a pixel value of the K-th pixel of the j-th stripe of a captured image of the grating stripes in the i-th angle.

In step 5, it is determined whether a fold exists in the to-be-detected paper currency by comparing the gradient changing cumulative value P corresponding to the to-be-detected paper currency with a preset determining threshold T. It is determined that the fold does not exist in the to-be-detected paper currency in a case that P≤T, and the to-be-detected paper currency is allowed to be circulated. It is determined that the fold exists in the to-be-detected paper currency in a case that P>T, and the to-be-detected paper currency is not allowed to be circulated.

In order to implement the above method for identifying, the determining threshold T needs to be pre-determined. Obtaining the determining threshold T includes following step 1 to step 6.

In step 1, a circulated paper currency transported from the note-transporting organization is received, and the laser light generated by the laser source 4 is projected into grating stripes which changes to be bright or to be dark according to a certain rule on the circulated paper currency 2 through the rectangular grating 3 and the protective body 1. The circulated paper currency refers to a paper currency sample can be normally circulated in accordance with a regulation of the People's Bank of China, and the grating stripes which changes to be bright or to be dark according to the certain rule refer to stripes generated by modulating the laser light by the rectangular grating. For example, FIG. 2 is a schematic diagram of projected rectangular grating stripes, and FIG. 3 is a schematic diagram showing that the stripe is curved in an image of the grating stripes caused by a paper currency fold.

In step 2, the area array photoelectric sensor 6 acquires an image of the circulated paper currency attached with the grating stripes through the imaging lens group 5, and a feature image of the grating stripes is obtained from the acquired image of the circulated paper currency attached with the grating stripes.

In step 3, the rectangular grating 3 is rotated, it is changed a direction of the grating stripes projected on the circulated paper currency by the laser source through the rectangular grating, step 2 is repeated to be performed to obtain the feature images of the grating stripes in n angles from the images of the circulated paper currency attached with the grating stripes, where n is an integer more than or equal to 2.

In a case that the direction of the paper currency fold is consistent with the direction of the projected grating stripes, the captured grating stripes can not reflect the fold phenomenon in this direction. In order to effectively detect fold information of the paper currency in all directions, images of the projected grating stripes in angles the number of which is more than or equal to 2 needs to be captured. Preferably, n is an integer more than or equal to 8. Rotating angles of the rectangular grating are angles generated by evenly dividing a 360 degrees field into n−1 parts. Taking 8 angles as an example, the rotating angle refers to an angle corresponding to a line where a pixel center of one grating image and a pixel center of another grating image adjacent to the one grating image are located. The 8 angles mean that the rotating angles of the rectangular grating are 0 degree, 45 degree, 90 degree, 135 degree, 180 degree, 225 degree, 270 degree and 315 degree respectively. That is, the rotating angles of the rectangular grating are generated by evenly dividing the 360 degrees field into 7 parts. In a case that n is more than 8, the 360 degrees field is further evenly divided on basis of 0 degree, 45 degree, 90 degree, 135 degree, 180 degree, 225 degree, 270 degree and 315 degree, that is, the 360 degrees field is evenly divided into n−1 parts. Taking 12 angles as an example, the 12 angles mean that the rotating angles of the rectangular grating may be 0 degree, 30 degree, 60 degree, 90 degree, 120 degree, 150 degree, 180 degree, 210 degree, 240 degree, 270 degree, 300 degree and 330 degree respectively, that is, the rotating angles of the rectangular grating are generated by evenly dividing the 360 degrees field into 11 parts.

In step 4, the information processing module 7 calculates a gradient changing cumulative value S of the feature images of the grating stripes in n angles along the directions of the grating stripes corresponding to the circulated paper currency based on the feature images of the grating stripes in n angles of the circulated paper currency. The formula for the gradient changing cumulative value S is $$S = \sum_{i=1}^{n} \sum_{j=1}^{M} \sum_{K=1}^{N} [P(i, j, K+1) - P(i, j, K)],$$

where i represents the number of rotating angles of the rectangular grating, n represents an integer more than or equal to 2, M represents the number of changes between being bright and being dark of the image of the grating stripes, N represents the number of pixels of a single stripe along the direction of the stripe, and P(i, j, K) represents a pixel value of the K-th pixel of the j-th stripe of a captured image of the grating stripes in the i-th angle.

In step 5, the information processing module 7 performs step 1 to step 4 for each of U circulated paper currency samples to obtain the gradient changing cumulative value $S_a$ of the feature images of the grating stripes along the directions of the grating stripes corresponding to each of circulated paper currencies, where a is a natural number, a=1, 2, . . . , U, and U>=200. The bigger the value of U is, the better the identifying effect is.

In step 6, the determining threshold T for determining whether the fold exists in the paper currency is obtained by adopting a neural network learning and training method and a statistical analysis model including a range analysis, a variance analysis and an interval estimation weighted analysis for the gradient changing cumulative value $S_a$ as a feature.

The information processing module 7 obtains a range analysis value r, a variance analysis value f and an interval estimation weighted value q as three statistical features of the gradient changing cumulative value $S_a$ of the circulated paper currency samples. The specific formulas are as follows.

The specific formula for the range analysis is:

$$r = \frac{\max(S_a) - \min(S_a)}{2}, a = 1, 2, \ldots, U,$$

where a range analysis value r corresponds to half of a maximum value and a minimum value of the folds of the circulated paper currency samples, and U represents the number of the paper currency samples.

The specific formula for the variance analysis is:

$$f = \sum_{a=1}^{U} [S_a - \overline{S}],$$

where a variance analysis value f corresponds to a fluctuation degree of the folds of the circulated paper currency samples, U represents the number of the paper currency samples, $\overline{S}$ represents an average value of the gradient changing cumulative values of the circulated paper currency samples, and a specific formula for $\overline{S}$ is:

$$\overline{S} = \frac{\sum_{a=1}^{U} S(a)}{U}.$$

The specific formula for the interval estimation weighted is:

$$q = Z_{1-b} \frac{d}{\sqrt{U}},$$

where an interval estimation weighted value q corresponds to a parameter estimation of the folds of the circulated paper currency samples, U represents the number of the paper currency samples, $Z_{1-b}$ represents a confidence factor, 1-b represents a confidence level, and d represents a scale parameter.

Compared with a method of adopting an experiencing value or a single statistical parameter analysis to determine the determining threshold T, in the method for identifying the paper currency fold according to this embodiment, the range analysis, the variance analysis and the interval estimation weighted analysis as three parameters are used to characterize a fold state of the circulated paper currency, which may reflects the fold state of the paper currency more completely. The determining result is more real and reliable and has a stronger universality.

The information processing module 7 learns and trains based on a range analysis statistic value r, a variance analysis statistic value f and an interval estimation weighted analysis value q by adopting an artificial neural network method. The basic principle is described as follows. An error of a direct leading layer of an output layer is estimated by utilizing an outputted error of the output layer, an error of a layer in front of the direct leading layer is estimated by utilizing the error of the direct leading layer, and it is iterated layer by layer in the above manner to estimate an error of each of layers. An neural network changes continually a connection weight value of the network under stimulation from an outside inputted sample, to make an output of the network continually close to an expected output. A range analysis weight value $\omega_1$, a variance analysis weight value $\omega_2$ and an interval estimation weight value $\omega_3$ are obtained, and then it is obtained the threshold T of the gradient changing cumulative value for determining whether the stripe is curved in an image of the grating stripes, where a specific formula for the threshold T is:

$$T = \overline{S} + \omega_1 r + \omega_2 f + \omega_3 q.$$

According to the disclosure, a detection for determining whether a fold exists in the paper currency is converted into a detection for determining whether the stripe is curved in an image of the grating stripes, which effectively avoids effect of color cast phenomena on the identification of the paper currency fold caused by the gray values of the captured image of the paper currency changing in different temperature situations. In the disclosure, the threshold for determining whether a fold state of the paper currency affects the circulation of the paper currency is determined by taking the gradient changing cumulative value of the images of the grating stripes along the directions of the stripes corresponding to the circulated paper currency samples as a feature and by analyzing multiple statistical parameters and using a learning and training method, and effective identification of the paper currency fold is achieved. Compared with a method of adopting an experiencing value or a single statistical parameter analysis to determine the threshold, the method for determining the threshold according to the disclosure is more real and reliable and has a stronger universality.

The above descriptions only illustrate the preferred embodiments of the disclosure. It should be noted that, the above preferred embodiments should not be considered as the limits to the disclosure. The protection scope of the disclosure should be based on the scope limited by the claims. For those skilled in the art, modifications and retouching may be made without departing from the spirit or scope of the disclosure. The modifications and retouching should be considered to fall in the protection scope of the disclosure.

The invention claimed is:

1. A method for identifying a paper currency fold, comprising:
    step 1, receiving a to-be-detected paper currency transported from a note-transporting organization, and projecting laser light generated by a laser source into grating stripes which changes to be bright or to be dark according to a certain rule on the to-be-detected paper currency through a rectangular grating and a protective body;
    step 2, acquiring, by an area array photoelectric sensor, an image of the to-be-detected paper currency attached with the grating stripes through an imaging lens group, and obtaining a feature image of the grating stripes from the acquired image of the to-be-detected paper currency attached with the grating stripes;
    step 3, rotating the rectangular grating, changing a direction of the grating stripes projected on the to-be-detected paper currency by the laser source through the rectangular grating, repeating to perform step 2 to obtain the feature images of the grating stripes in n angles from the images of the to-be-detected paper currency attached with the grating stripes, with n being an integer more than or equal to 2;

step 4, calculating, by an information processing module, a gradient changing cumulative value P of the feature images of the grating stripes in n angles along the directions of the grating stripes corresponding to the to-be-detected paper currency based on the feature images of the grating stripes in n angles of the to-be-detected paper currency; and step 5, determining whether a fold exists in the to-be-detected paper currency by comparing the gradient changing cumulative value P corresponding to the to-be-detected paper currency with a preset determining threshold T.

2. The method for identifying the paper currency fold according to claim 1, wherein the preset determining threshold T is obtained by:

step 1, receiving a circulated paper currency transported from the note-transporting organization, and projecting the laser light generated by the laser source into grating stripes which changes to be bright or to be dark according to a certain rule on the circulated paper currency through the rectangular grating and the protective body;

step 2, acquiring, by the area array photoelectric sensor, an image of the circulated paper currency attached with the grating stripes through the imaging lens group, and obtaining a feature image of the grating stripes from the acquired image of the circulated paper currency attached with the grating stripes;

step 3, rotating the rectangular grating, changing a direction of the grating stripes projected on the circulated paper currency by the laser source through the rectangular grating, repeating to perform step 2 to obtain the feature images of the grating stripes in n angles from the images of the circulated paper currency attached with the grating stripes, with n being an integer more than or equal to 2;

step 4, calculating, by the information processing module, a gradient changing cumulative value S of the feature images of the grating stripes in n angles along the directions of the grating stripes corresponding to the circulated paper currency based on the feature images of the grating stripes in n angles of the circulated paper currency;

step 5, performing, by the information processing module, step 1 to step 4 for each of U circulated paper currency samples to obtain the gradient changing cumulative value $S_a$ of the images of the grating stripes along the directions of the grating stripes corresponding to each of circulated paper currencies, wherein a=1, 2, ..., U; and step 6, obtaining, by the information processing module, the determining threshold T for determining whether the fold exists by adopting at least one of a statistical analysis model and an artificial neural network learning and training method for the gradient changing cumulative value $S_a$ as a feature.

3. The method for identifying the paper currency fold according to claim 2, wherein the circulated paper currency refers to a paper currency sample can be normally circulated in accordance with a regulation of the People's Bank of China, and the grating stripes which changes to be bright or to be dark according to the certain rule refer to stripes generated by modulating the laser light by the rectangular grating.

4. The method for identifying the paper currency fold according to claim 2, wherein the statistical analysis model comprises at least one of a range analysis, a variance analysis and an interval estimation weighted analysis.

5. The method for identifying the paper currency fold according to claim 4, wherein a specific formula for the range analysis is:

$$r = \frac{\max(S_a) - \min(S_a)}{2}, a = 1, 2, \ldots, U,$$

wherein a range analysis value r corresponds to half of a maximum value and a minimum value of the folds of the circulated paper currency samples, and U represents the number of the paper currency samples.

6. The method for identifying the paper currency fold according to claim 4, wherein a specific formula for the variance analysis is:

$$f = \sum_{a=1}^{U} [S_a - \overline{S}], a = 1, 2, \ldots, U,$$

wherein a variance analysis value f corresponds to a fluctuation degree of the folds of the circulated paper currency samples, U represents the number of the paper currency samples, S represents an average value of the gradient changing cumulative values $S_a$ of the circulated paper currency samples, and a specific formula for $\overline{S}$ is:

$$\overline{S} = \frac{\sum_{a=1}^{U} S(a)}{U}, a = 1, 2, \ldots, U.$$

7. The method for identifying the paper currency fold according to claim 4, wherein a specific formula for the interval estimation weighted analysis is:

$$q = Z_{1-b} \frac{d}{\sqrt{U}},$$

wherein an interval estimation weighted value q corresponds to a parameter estimation value of the folds of the circulated paper currency samples, U represents the number of the paper currency samples, $Z_{1-b}$ represents a confidence factor, 1-b represents a confidence level, and d represents a scale parameter.

8. The method for identifying the paper currency fold according to claim 4, wherein step 6 comprises:

learning and training, by the information processing module, based on a range analysis statistic value r, a variance analysis statistic value f and an interval estimation weighted analysis value q by adopting an artificial neural network method;

estimating an error of a direct leading layer of an output layer by utilizing an outputted error of the output layer, estimating an error of a layer in front of the direct leading layer by utilizing the error of the direct leading layer, and iterating layer by layer in the above manner to estimate an error of each of layers;

changing continually, by an artificial neural network, a connection weight value of the network under stimulation from an outside inputted sample, to make an output of the network continually close to an expected output; and obtaining a range analysis weight value $\omega_1$, a variance analysis weight value $\chi_2$ and an interval estimation weight value $\omega_3$, and then obtaining the threshold T of the gradient changing cumulative value for determining whether the stripe is curved in an image of the grating stripes, wherein a specific formula for the threshold T is:

$$T=\overline{S}+\omega_1 r+\omega_2 f+\omega_3 q,$$

wherein $\underline{S}$ represents an average value of the gradient changing cumulative values $S_a$ of the circulated paper currency samples.

9. The method for identifying the paper currency fold according to claim 2, wherein n is an integer more than or equal to 8, rotating angles of the rectangular grating are angles generated by evenly dividing a 360 degrees field into n−1 parts.

10. The method for identifying the paper currency fold according to claim 2, wherein the gradient changing cumulative value P or S of the feature images of the grating stripes in n angles along the directions of the grating stripes is calculated based on a following formula:

$$P \text{ or } S = \sum_{i=1}^{n} \sum_{j=1}^{M} \sum_{K=1}^{N} [P(i, j, K+1) - P(i, j, K)]$$

wherein i represents the number of rotating angles of the rectangular grating, n represents an integer more than or equal to 2, M represents the number of changes between being bright and being dark of the feature image of the grating stripes, N represents the number of pixels of a single stripe along the direction of the stripe, and P(i, j, K) represents a pixel value of the K-th pixel of the j-th stripe of a captured image of the grating stripes in the i-th angle.

11. The method for identifying the paper currency fold according to claim 1, wherein n is an integer more than or equal to 8, rotating angles of the rectangular grating are angles generated by evenly dividing a 360 degrees field into n−1 parts.

12. The method for identifying the paper currency fold according to claim 1, wherein the gradient changing cumulative value P of the feature images of the grating stripes in n angles along the directions of the grating stripes is calculated based on a following formula:

$$P = \sum_{i=1}^{n} \sum_{j=1}^{M} \sum_{K=1}^{N} [P(i, j, K+1) - P(i, j, K)],$$

wherein i represents the number of rotating angles of the rectangular grating, n represents an integer more than or equal to 2, M represents the number of changes between being bright and being dark of the feature image of the grating stripes, N represents the number of pixels of a single stripe along the direction of the stripe, and P(i, j, K) represents a pixel value of the K-th pixel of the j-th stripe of a captured image of the grating stripes in the i-th angle.

\* \* \* \* \*